Oct. 19, 1937.        A. DEL RIO        2,096,650
STEERING MECHANISM FOR MOTOR VEHICLES
Filed March 17, 1936        3 Sheets-Sheet 1
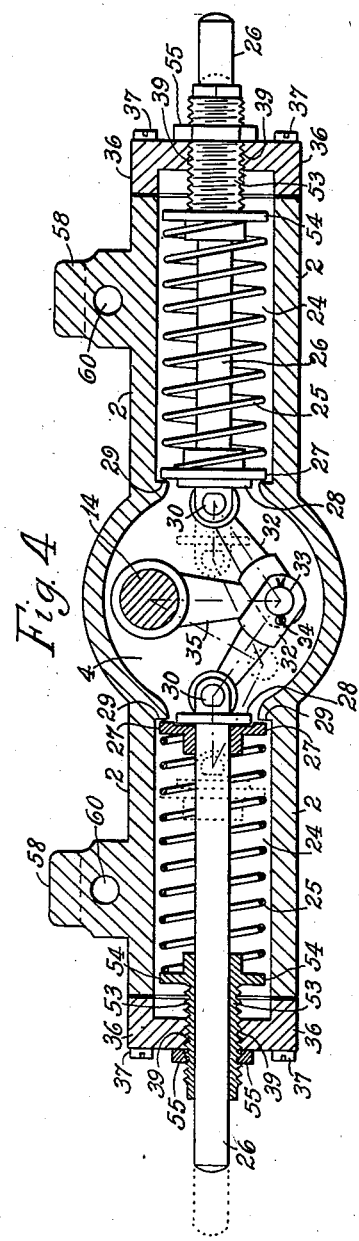
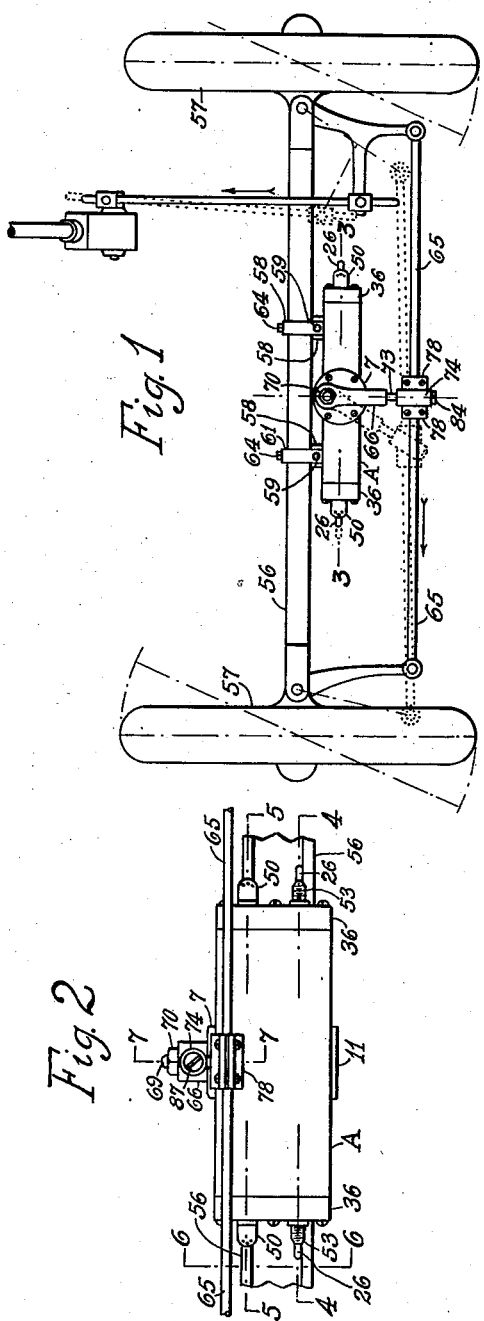
Inventor
Abel del Rio
By Bhinger, atty

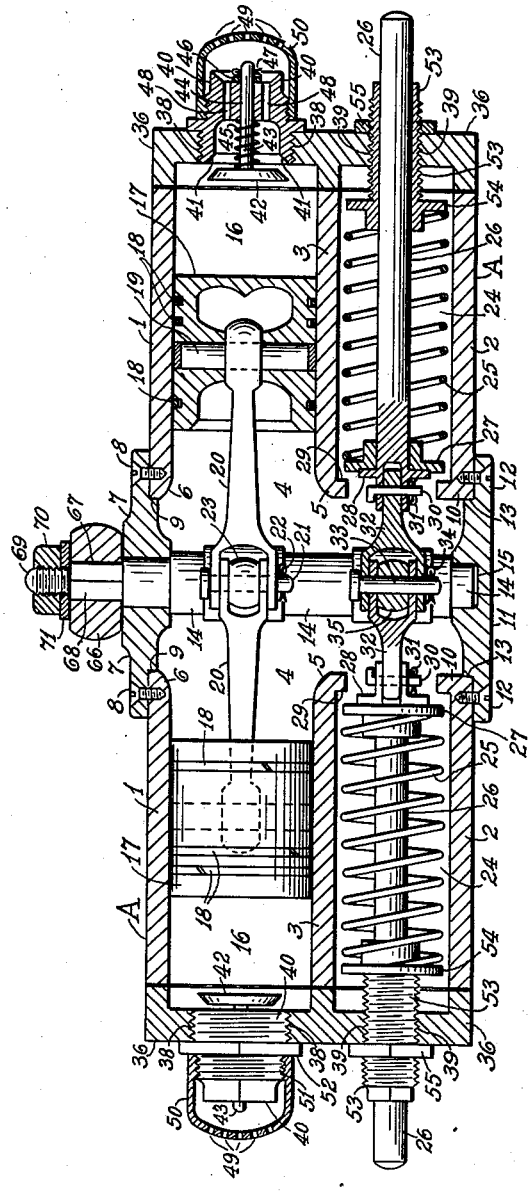

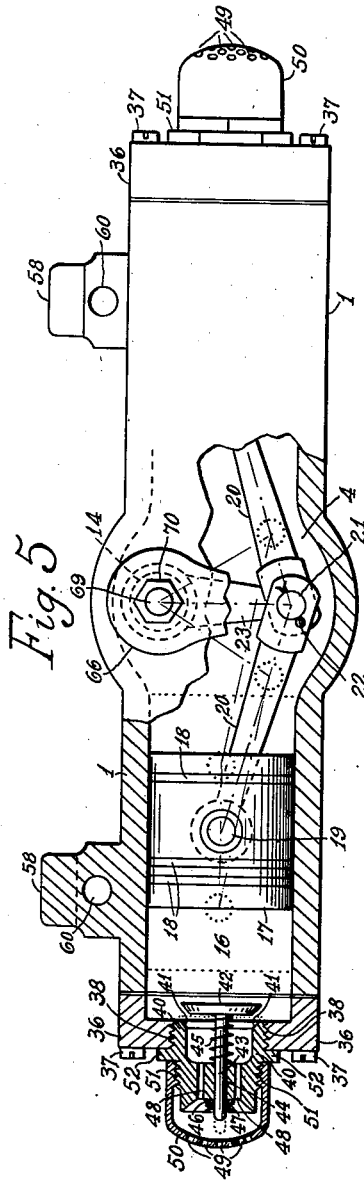

Patented Oct. 19, 1937

2,096,650

UNITED STATES PATENT OFFICE 2,096,650

STEERING MECHANISM FOR MOTOR VEHICLES

Abel del Rio, Habana, Cuba

Application March 17, 1936, Serial No. 69,398
In Cuba February 19, 1936

5 Claims. (Cl. 280—94)

This invention relates to steering mechanisms for motor vehicles, and it has for its object to provide, in connection with a steering mechanism, a device for automatically neutralizing said mechanism so that the steering rod may always stand in an intermediate or neutral position between the turn-to-right and turn-to-left positions and that upon it being removed from the same neutral position by the operation of the steering wheel in turning or by a puncturing of the front wheel tires or an obstruction on the road, it may automatically tend to return to the neutral position through the action of the device of this invention, by means of a reaction force developed in a compressible means upon it being compressed. Such force will be sufficiently great but not enough to prevent the steering mechanism from having the softness and flexibility which are required in order that the motorist may not get tired, and with the advantage that the motorist's exertion to govern the steering wheel is only necessary when turning the vehicle, for the device of this invention controls the steering wheel during the traveling of the vehicle directly ahead. Other advantages that will result from the application of this invention are: to avoid the accidents at present caused by the puncturing of the front wheel tires of motor vehicles and by obstructions on the road, and to counteract the oscillation of the front wheels as caused by irregularities in rough roads and by the vibrations or shocks of the vehicle.

The invention is described with reference to the figures of the accompanying drawings, of which:

Fig. 1 is a top plan view of the front shaft and wheels of a motor vehicle, showing the neutralizer device being the subject-matter of this invention, as connected to the steering rod.

Fig. 2 is a partial elevational front view of the neutralizer device and the steering rod to which it is connected.

Fig. 3 is an enlarged vertical section view on line 3—3 of Fig. 1.

Fig. 4 is an enlarged horizontal section view on line 4—4 of Fig. 2.

Fig. 5 is partly an enlarged top plan view of the neutralizer device and partly a horizontal section view on line 5—5 of Fig. 2.

Fig. 6 is an enlarged vertical cross-section view on line 6—6 of Fig. 2.

Fig. 7 is an enlarged detail view in vertical cross-section on line 7—7 of Fig. 2.

The neutralizer device constituting the subject-matter of this invention is composed of a casing A made of cast metal and formed with two cylinder members, one upper 1 and another lower 2 divided by a partition 3, the two cylinders 1 and 2 lying horizontally and each cylinder being longitudinally divided into two cylindrical chambers spaced apart by a vertical space 4 at the centre which effects communication between the central portions of the two cylinders 1 and 2 through a central opening 5 in the partition 3. Said opening 5 is in vertical alinement with two other openings, one 6 in the top portion of the casing, which is closed by a horizontal cover 7 fixed on the top portion of the casing by screws 8, the edge of the opening 6 being received in a recess 9 formed on the lower face of the cover 7; and another opening 10 in the lower portion of the casing, which opening is closed by another horizontal cover 11 fixed to said lower portion by screws 12, the edge of the wall in which is located said opening 10 fitting into a recess 13 formed on the upper face of said cover 11. The upper cover 7 and lower cover 11 form bearings for a vertical crank-shaft 14 which has its lower end lodged in a socket 15 formed on the lower cover 11 and which is rotatably mounted in a bearing formed on the upper cover 7, it extending above same for connection as will be explained hereinafter.

The two cylindrical chambers of the upper cylinder 1 properly form air compression chambers 16 and within each of them is positioned a piston 17 provided with anti-friction metal rings 18, the two opposed pistons 17 being pivotally connected by means of pins 19 with connecting-rods 20 pivotally connected by a pin 21 secured by a cotter pin 22, with a common crank-arm 23 fixed on the vertical shaft 14. The two cylindrical chambers of the lower cylinder 2 properly form compression chambers 24 for coil springs, and within each of them is lodged a coil spring 25 held around a longitudinal bar 26 an end of which, the one closest to the centre of the casing, rests on a disc 27 retained on the bar 26 by an annular flange 28 formed on said bar 26, said disc 27 being adapted to butt at its edge against a projecting annular flange 29 formed on the inner end of each chamber, the two opposed bars 26 being connected at their inner end by means of pins 30, secured by cotter pins 31, with the perforated ends of connecting-rods 32 connected by means of a pin 33 secured by a cotter pin 34, with a crank-arm 35 fixed to the vertical shaft 14.

The ends of the casing are closed by cast covers 36 fixed to the edges of the casing by screws 37 and which properly form two covers respectively for the air compression chambers 16 and for the spring compression chambers 24, each cover 36 having a threaded opening 38 in alinement with the axis of each chamber 16, and another threaded opening 39 in alinement with the axis of each chamber 24.

In the threaded opening 38 is threadedly mounted a valve casing 40 having at its inner end a seat 41 to receive a frustro-conical valve 42 whose stem 43 is slidably mounted in a longitudinal hole 44 formed in the solid end portion of the valve casing 40, a coil spring 45 being located on the stem 43, which rests at its inner end against the outer face of the valve 42 and at its outer end against the inner face of the solid end portion of the valve casing 40, the stem 43 having mounted on its end portion projecting outside the valve casing 40, a stop washer 46 retained by a cotter pin 47, and in the end solid portion of the valve casing 40 are formed openings 48 to let the air pass into and from the chamber 16 through openings 49 formed in a cap 50 which is threaded on an outer threaded portion 51 of the valve casing 40 and which engages the end face of the cover 36. 52 is a squared portion of the valve casing 40 to which a wrench can be applied for the purpose of adjustment.

In the threaded opening 39 of each cover 36 is mounted an outer threaded tubular plug 53 within which is slidably mounted the bar 26 and which serves to adjust the tension of the coil spring 25, to which end the outer end of this spring rests against a disc 54 formed at the inner end of said threaded plug 53, and the adjusted position of the plug 53 is secured by means of a nut 55 threaded on the threaded end portion of the plug 53 and retained by the end face of the casing 36.

The casing or block comprising the two cylinders 1 and 2 is mounted in front of the centre of the axle 56 of the front wheels 57 of a motor vehicle, parallelly to same (Fig. 1). The casing has at its rear portion a pair of heels 58 (Fig. 5) of a special shape to fit into the side hollow of the front axle 56 which preferably has an I-crosssection, the casing being secured in that position by means of bolts 59 passing through vertical holes 60 formed in the base portion of said heels 58 and through holes in the ends of metallic plate-clamps 61 embracing the axle 56 at the free part of its cross-section outline, the screws 59 being secured by nuts 62, and for a greater security, each clamp 61 has at its vertical portion a threaded hole in a cylindrical enlargement 63 through which is screwed a clamp screw 64 whose point rests against the side face of the axle 56.

The vertical crank-shaft 14 projecting above the casing or block forming the cylinders 1 and 2, is connected with the steering rod 65 which may be located in front of the axle 56 as shown in Fig. 1 of the drawings, or it may be located behind said axle 56, with relation to the front of the motor vehicle, according to the kind of vehicle or the commercial use to which it is appropriated, but generally said steering rod is located, in heavy vehicles, in front of the axle 56. The connection may be made by means of a crank-arm 66 which has at its broadest end a square hole 67 to fit on a square portion 68 formed on the upper projecting portion of said shaft 14 which ends in a reduced threaded portion 69 adapted to receive a nut 70 with an interposed washer 71.

The crank-arm 66 is formed at its narrowest end with a socket 72 to receive in a loose telescopical movement a horizontal stem 73 projecting from the end of a ball connecting casing 74 of cylindrical cross-section which has at its lower portion an opening 75 of sufficient width to permit the insertion in the inner hollow of said casing 74 of a connecting ball 76 integral with a projection 77 extending upward at the centre of the upper half of a clamp 78 the two semicircular portions of which embrace the steering rod 65 and are secured one to the other at their straight end portions by bolts 79 passing through holes in said clamp portions and by nuts 80. The ball 76 is flexibly secured in the inner hollow of the ball casing 74 by means of two anti-friction metal discs, one stationary 81 provided with a horizontal stem 82 lodged in a socket 83 formed on the closed end of said casing 74, and another movable disc 84 provided with a horizontal stem 85 around which is held a coil spring 86 which at one end rests on the adjacent face of said disc 84 and at the other end rests on a threaded plug 87 threadedly mounted in a threaded opening 88 formed at the open end of said casing 74 and which serves to control the elastic tension of said spring 86, the plug 87 having at its outer face a groove 89 for its manipulation by a screw-driver.

The operation of the device is founded on the utilization of the reaction forces produced by the coil springs 25, located in the chambers 24, and by the air columns in the chambers 16 of the cylinder 1 when one of the pistons 17 and one of the bars 26 are instantaneously displaced upon the steering rod 65 being actuated in one direction or another, through the sliding connecting casing 74 and the crank-arm 66 oscillating at a small angle, it carrying along the crank-shaft 14, when a puncturing of the pneumatic tires of the vehicle front wheels 57 or when an irregularity or obstruction on the road tends to deviate the vehicle course.

The operation will be as follows: as the vehicle is turned either to the right or to the left by means of the steering wheel, the steering rod 65, upon being displaced from its centre or neutral position, causes the angular oscillation at a small angle of the crank-arm 66 through the slidable ball connection formed by the ball casing 74 and the clamp 78, and at the same angle oscillates the crank-shaft 14 which by means of the crank-arm 23 and one of the connecting-rods 20 actuates one of the longitudinal bars 26 and causes one of the coil springs 25 to be compressed. It should be understood that both pistons and both longitudinal bars move together. But, upon the turning being completed, the elastic reaction force of the compressed spring 25 causes the steering rod 65 to take its central position.

On the other hand, on the steering rod 65 actuate the outer forces represented by the obstructions or irregularities in the road which tend to deviate the front wheels 57 of the vehicle and therefore to remove the steering rod 57 from its neutral position.

It results, then, that two forces actuate upon the steering rod 65: first, the force represented by the exertion upon the steering wheel by the hand of the motorist for turning to the right or to the left, and second, the deviation force produced by any obstruction on the road. The first force is exercised slowly and smoothly either in one direction or the other, while the second force is exercised suddenly and unexpectedly. The latter force, being abnormal, is always greater than the former force and proportional to the speed at which the vehicle travels, and said latter force is the one that by its magnitude causes the compression of one of the springs 25 and the movement of the piston 17 at the same side of the device within its respective chamber 16, thus creating a compression of the air column within said chamber that may overcome the resistance of the spring 45 of the compression valve 42 and cause the latter to close, but the steering rod 65 and the front wheels 57 should return to their normal position, by virtue of the elastic reaction force developed by the spring 25 and the action of the outer force which actuated the air compression within the chamber 16. This spring 25 is sufficient to resist the displacement of the steering rod 65 from its center or neutral position and to return the steering rod 65 to its center or neutral position when the displacement of the steering rod 65 is slow and smooth.

The result is that by means of this device, the steering rod 65 is usually standing in its centre or neutral position from which it can only be removed by the operation of the steering wheel by the hand of the motorist or by an outer force actuating the front wheels of the vehicle and causing them to deviate. In either case, the inner mechanism will automatically return the steering rod back to its neutral position, and therefore it will not be necessary for the motorist, as it happens at the present time, to constantly govern the steering wheel with his hands, when the vehicle is traveling directly ahead, except for turning to right or to left. Consequently, the accidents caused by outer obstructions in traveling abnormally or at a great speed, will not have the fatal results occurring at present, because this device will, by its function, neutralize the steering rod, and by tending to neutralize it quickly when it be removed from its neutral position by any unexpected outer force.

It is obvious that many modifications may be made in the structure and construction details of this device, without altering the spirit of the invention, which is such as defined by the scope of the appended claims.

What I claim is:

1. A steering mechanism for motor vehicles which have front wheels and a front axle and a steering rod connected to the front wheels, comprising a vertical oscillatory shaft, means providing a slidable universal connection between said shaft and the steering rod at the centre of the latter, a casing rotatably supporting said vertical oscillatory shaft, means for securing the casing to said axle of the front wheels at the centre of this axle, spring compression chambers located within the casing at both sides of said vertical oscillatory shaft, air chambers in the casing at both sides of said vertical oscillatory shaft, longitudinal bars slidably mounted within the first chambers, coil springs coiled around said slidable bars and so mounted that said springs may be compressed within their respective chambers, pistons slidably mounted within the second chambers mentioned, valves mounted on the casing at one end of the second chambers and adapted to be closed by the compression of the air column within the respective chamber, and means pivotally connecting the slidable bars of the first chambers and the pistons of the second chambers with the oscillatory shaft so that as the oscillatory shaft is first oscillated one of the springs respectively lodged within the first chambers may be compressed and thereafter only in a sudden movement of the steering rod, one of the air columns respectively in the second chambers may be compressed to close the respective valve, so that the reaction of the spring compressed respectively in one of the first chambers may cause the steering rod to return to its neutral position when it be removed therefrom by the action of an outer agent upon the front wheels of the vehicle.

2. A steering mechanism for motor vehicles which have front wheels and a front axle and a steering rod connected to the front wheels, comprising a vertical oscillatory shaft, means providing a slidable universal connection between said shaft and the steering rod at the centre of the latter, a casing rotatably supporting said vertical oscillatory shaft, means for firmly securing the casing to the axle at the centre of this axle, horizontal spring compression chambers located within the casing at both sides of said vertical oscillatory shaft, horizontal air chambers located within the casing at both sides of said vertical oscillatory shaft, longitudinal bars slidably mounted within the first chambers, coil springs coiled upon said slidable bars, two discs, one fixed and another movable, mounted on each of the bars so that the respective spring may be compressed upon it therefore actuating the bar carrying it, pistons slidably mounted within the second chambers, spring valves mounted on the casing at one end of the second chambers and adapted to be closed by the compression of the air column within the respective chamber, and means pivotally connecting the slidable bars of the first chambers and the pistons of the second chambers with the oscillatory shaft so that as the oscillatory shaft oscillates upon withdrawal of the steering rod from its neutral position, first one of the springs respectively lodged in the first chambers above-mentioned may be compressed and thereafter only in a sudden movement of the steering rod, one of the air columns in the second chambers may be compressed to close the respective valve, so that the reaction of the spring compressed in one of the first chambers may tend to force the steering rod to return to its neutral position.

3. A steering mechanism for motor vehicles which have front wheels and a front axle and a steering rod connected to the front wheels, comprising a casing set adjacent said axle in front of the central portion of said axle, clamps and screws securing said casing laterally to said axle, a crank-shaft vertically mounted at the central portion of the casing and provided outside of the latter with a square portion, horizontal spring compression chambers within said casing at both sides of the crank-shaft, bars longitudinally slidable within said chambers, covers fixed by screws to the casing at the outer open ends of said chambers, tubular threaded plugs threaded in thread openings of the end covers and within which are slidably mounted said bars, coil springs coiled on the slidable bars within said chambers, two discs, one fixed to the threaded plug and another movable with the slidable bar on which respectively rest the ends of each coil spring, a crank-arm fixed to the crank-shaft, connecting-rods pivotally connected to the crank-arm and to the inner ends of the slidable bars, an arm mounted on the square portion of the crank-shaft outside the casing, a steering rod and an elastic ball and socket connection between said arm and said steering rod, so that upon the steering rod being withdrawn from its neutral position and the crank-shaft oscillating to one side or the other, an elastic reaction tending to cause the steering rod to return to its neutral position will be obtained.

4. A steering mechanism for motor vehicles which have front wheels and a front axle and a steering rod connected to the front wheels, comprising a casing set adjacent said axle in front of the central portion of said axle, clamps and screws securing said casing laterally to said axle, a crankshaft vertically mounted at the central portion of the casing and provided outside the latter with a square portion, air chambers in said casing and at both sides of the crank-shaft, pistons slidably mounted within said chambers, covers screwed to the casing at the outer open ends of said chambers, valve casings threaded in threaded openings of the covers and located in axial alignment with the chambers, spring-actuated valves slidably mounted in said valve casing and which are adapted to close outwards when the rapid movement of the piston compresses the air within said chambers, air pass openings in said valve casings, horizontal spring compression chambers within said casing at both sides of the crank-shaft and below the air chambers, bars longitudinally slidable within the spring compression chambers, tubular threaded plugs threaded in thread openings of the end covers and within which are slidably mounted said bars, coil springs coiled on the slidable bars within said spring chambers, two discs, one of which is fixed to the threaded plug and the other is movably affixed to the slidable bar and on said discs respectively rest the ends of each coil spring, a crank-arm fixed to the crankshaft, connecting-rods pivotally connected to the crank-arm and to the pistons and slidable bars, an arm mounted on the square portion of the crank-shaft outside the casing, a steering rod and an elastic ball and socket connection between said arm and said steering rod, so that upon the steering rod being withdrawn from its neutral position by the action of an outer agent upon the front wheels of the vehicle and causing the crankshaft to oscillate to one side or the other, initially one of the coil springs in the compression chambers may be compressed to develop an elastic reaction tending to cause the steering rod to return to its neutral position and thereafter only in a sudden action from such outer agent the air compression of the air column lodged in the air chamber at the same side of the casing by the action of the respective piston may because of the closing of the respective valve and the compression of the air in the cylinder prevent excessive deviation of the steering rod from its neutral position.

5. A steering mechanism for motor vehicles having front wheels and a front axle and a steering rod connected to the front wheels comprising a vertical oscillatory shaft, means providing a slidable universal connection between said shaft and the steering rod at the center of the latter, a casing rotatably supporting said vertical oscillatory shaft, means for attaching the casing to the center of the front axle, a spring compression chamber at each side of the vertical oscillatory shaft, a bar longitudinally slidable within each side chamber, a coil spring coiled around each bar and so mounted that it may be compressed within each side chamber, and a crank arm pivotally connecting at the same point the two bars with the vertical oscillatory shaft and adapted for compressing one of the springs on its respective supporting bar upon the shaft being oscillated in one or the other directions so that the elastic reaction of the compression spring may tend to cause the steering rod to return to its neutral position when it is removed therefrom.

ABEL DEL RIO.